(12) United States Patent
Reul et al.

(10) Patent No.: US 7,414,357 B2
(45) Date of Patent: Aug. 19, 2008

(54) GLASS PANE WITH OPAQUE COATING

(75) Inventors: Bernhard Reul, Herzogenrath (DE);
Volkmar Offermann, Eschweiler (DE);
Horst Mercks, Aachen (DE); Walter Goerenz, Alsdorf (DE); Dieter Linnhoefer, Stolberg (DE)

(73) Assignee: Saint-Gobain Glass France, Courbevoie (FR)

( * ) Notice: Subject to any disclaimer, the term of this patent is extended or adjusted under 35 U.S.C. 154(b) by 297 days.

(21) Appl. No.: 10/479,346

(22) PCT Filed: May 22, 2002

(86) PCT No.: PCT/FR02/01719

§ 371 (c)(1),
(2), (4) Date: Jul. 13, 2004

(87) PCT Pub. No.: WO02/098179

PCT Pub. Date: Dec. 5, 2002

(65) Prior Publication Data

US 2004/0237430 A1     Dec. 2, 2004

(30) Foreign Application Priority Data

Jun. 1, 2001   (DE) ............................. 101 26 868

(51) Int. Cl.
*H01J 29/10*     (2006.01)

(52) U.S. Cl. .................. 313/463; 313/498; 313/512
(58) Field of Classification Search ............... 313/463, 313/498, 512; 315/169.1
See application file for complete search history.

(56) References Cited

U.S. PATENT DOCUMENTS 5,336,965 A * 8/1994 Meyer et al. ............ 313/498
5,917,280 A * 6/1999 Burrows et al. .......... 313/506

FOREIGN PATENT DOCUMENTS

| DE | 199 02 727 | | 7/2000 |
| EP | 0 267 331 | | 5/1988 |
| JP | 11251059 A | * | 9/1999 |

* cited by examiner

*Primary Examiner*—Toan Ton
*Assistant Examiner*—Hana A Sanei
(74) *Attorney, Agent, or Firm*—Oblon, Spivak, McClelland, Maier & Neustadt, P.C.

(57) ABSTRACT

A window (1) with an opaque coating (2) comprising a surface region (3) which has opaque surface portions (5) and which is perforated by surface portions (4) allowing light to pass through and distributed over the surface. At least one flat electroluminescent light element (EL) with several layers, including a transparent electrode (8), is placed in at least some of the opaque surface portions (5) of the surface region (3), which element, after applying an electrical supply voltage to the side of the transparent electrode (8), radiates light through at least one of the faces of the window (1).

10 Claims, 1 Drawing Sheet

GLASS PANE WITH OPAQUE COATING

Figure 1:
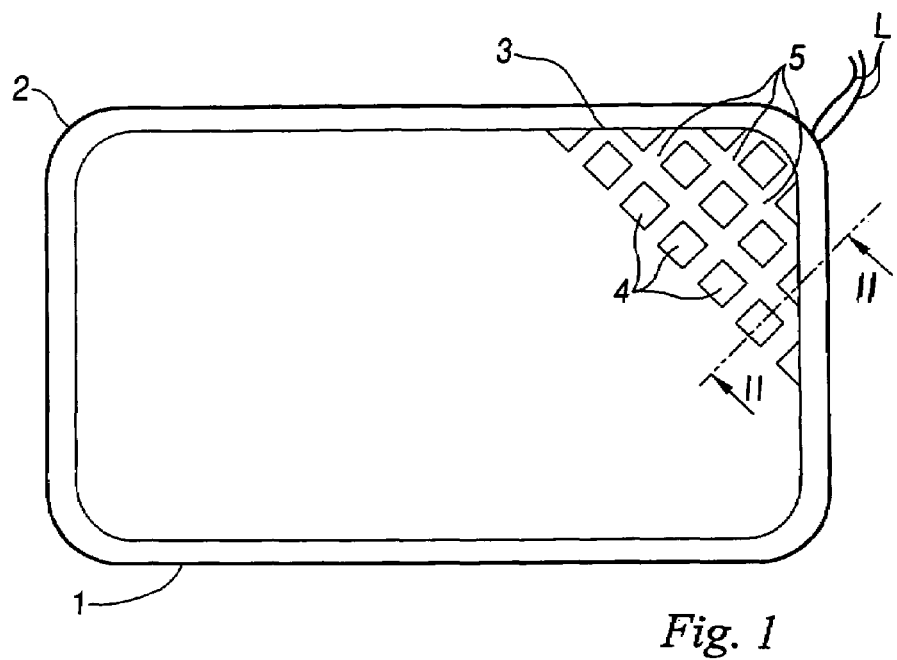

The invention relates to a window with an opaque coating comprising a surface region which has opaque surface portions and which is perforated by surface portions allowing light to pass through and distributed over the surface.

For panes (of windows), it is known (DE-C2-37 08 577) to reduce or to delimit their transparent surface portions by opaque coatings (in particular by opaque designs or patterns printed by screen printing and baked). Such panes are widely used for windows called sunroofs in motor vehicles, where the printed designs and their opaque (surface) portions act as a sunscreen and heat shield respectively. Cross-linked opaque coatings hide adhesive strips and also other parts which are fastened to the panes or integrated into the (laminated) windows. Finally, windshields for vehicles with a printed pattern provided to form a protective screen in the region between the folding sun visors are known (DE-C2-40 33 188).

A laminated window for vehicles, with a symbol embedded in the composite adhesive layer, which is represented by an electroluminescent light element or which may be illuminated from the rear, is known from EP-A1-0 267 331. The electrical conductors needed are represented in a virtually invisible manner by transparent conducting layers or pathways inside the composite. After switching on the supply voltage, the light symbol seems to float in the window without visible conductors. The document mentioned discloses two different types of light element. In the first, the two current carrying electrodes are provided on the same substrate and are straddled by the light element, which in turn comprises an intersection electrode. From the electrical point of view, two capacitors mounted in series are thus formed. In the second type, one of the two electrodes is placed each time in the form of a transparent thin layer on the two inner surfaces of the laminated window and the light element is placed therebetween. Also, the option according to which the light exiting through one of the windows can be prevented by means of an opaque coating is described therein.

The basic principles of electroluminescence have been known for a long time. A detailed documentation of this technology, with application examples, descriptions of material and the colors of light which can be produced is available at the Internet address "http://www.dupont.com/mcm/luxprint/about.html",(last updated May 2001), such that there is scope to consider the details only briefly here.

A capacitor is produced from two conducting layers, at least one of which is transparent/lets light through. On the transparent electrode, an (opaque) layer with light pigments and an insulating (dielectric) layer is inserted into the capacitor. If an A.C. voltage (normally 100 V) is applied to the two electrodes of this element, the latter excites currents in the light pigments which in turn create, by dispersive processes, light which exits through the transparent electrode.

The electrode layers together with the electroluminescent layer itself and the dielectric layer can be deposited by screen printing in a thick layer on suitable media, such as glass and PET films. By means of this known effect, surface light effects are obtained, which can be used for many applications (lighting, logos, illuminated signs), if one adapts to the relatively low light density and to the choice of colors which is limited by the materials which can be used. Furthermore, the electroluminescent elements (hereinafter, light elements) are not transparent by themselves, such that a face provided with them does not allow (day) light to pass through.

The object of the invention is to assign an additional function to an opaque coating, structured with transparent surface portions distributed over the surface, of a transparent (window) pane.

According to the invention, this objective is achieved by the fact that at least one flat electroluminescent light element with several layers, including a transparent electrode, is placed in at least some of the opaque surface portions of the surface region, which element, after applying an electrical supply voltage to the side of the transparent electrode, radiates light through at least one of the faces of the window.

In this way, the window, which serves for example as a sunscreen or a heat shield during the day in daylight, may also serve by low luminosity as an illumination system over its entire surface without any dark region being present since the light emitted by the electroluminescent element passes uniformly through the open surface portions and is also diffused uniformly through the opaque surface portions.

The characteristics of the secondary claims relate to advantageous variants of this object.

According to the latter, at least one electro-luminescent element laid down in several layers (light elements) with at least one transparent electrode, which emits light over (at least) one of the flat faces of the pane after applying a voltage, is combined with at least some of the opaque surface portions of the coating. Thus, the window allows light to pass through in the transparent surface portions and at the same time radiates light, on application of a current, through its nontransparent surface portions—which at the same time form the surface of the light element. The electroluminescent layer itself is opaque, as has already been mentioned. It does not have to be combined with another opaque coating.

A window of this type has a surprising effect from the visual and esthetic point of view—the surface portion considered "dark" itself now radiates light. It is possible to provide several light elements side by side to be switched on separately in various regions of the surface, it being possible for the electrodes and the current leads to be masked relatively simply under the opaque coating. In this case, the electrode allowing light to pass through may possibly be used as a common (ground) electrode for all the light elements. It is thus possible to obtain various light effects, or also to control the intensity of the light over several levels (depending on the respective surface to be illuminated and possibly on the color of its light).

In the application case mentioned, a partially transparent window pane of this sort may replace particular interior lighting in a motor vehicle, such as a sunroof in a motor vehicle with the light element in the "on" state and with enough area or light intensity, it however being possible for a certain amount of light still to enter by the top through the glazed roof during the day.

A prior condition for this double effect is naturally that, in the portions of window allowing light to pass through, as high a transparency as possible is provided which is undisturbed by conductor structures or the like. A fine resolution structure of this type may be created reproducibly, simply and reliably by the known method of screen printing. Naturally, it is important that the various layers of the light element are printed with very accurate superposition in the region of the pattern. However, this is also a well-mastered industrial process.

Naturally, light effects of the aforementioned type may also be obtained on all the other (laminated) windows, which are provided with a partially transparent printed pattern of this sort, thus for example in the sun visor region, if the higher costs incurred by producing multiple prints and electrical connections are acceptable.

Of course, it is not necessarily essential to embed a light element of this sort in a laminated window, but this arrangement will be preferred for reasons of safety with regard to the fairly high supply voltage. The embedded placement in a laminated window further protects the light element against mechanical action and against the penetration of moisture and of dirt.

The material of the window itself is in principle chosen freely; it is equally possible to use windows made of plastic or of glass. Similarly, hybrid composites can be manufactured industrially in a known manner.

In principle, it also does not matter whether the light element is applied or printed directly on a surface of such a window, or whether it is produced on a separate support substrate, such as for example a PET film, which will then satisfactorily be assembled to the rigid window or incorporated in a laminated composite.

Similarly, it is possible for the ratio of the surface area of the light element to the total surface area of the window, or to said surface region of the structured opaque coating to be chosen freely. As required, it is possible to place several light elements having, as appropriate, different colors and shapes, side by side.

Finally, it may also be beneficial in some application cases for light to be radiated by one or more electroluminescent light elements on both faces of the window. There is then no need for a separate opaque coating, since the electroluminescent layers themselves do not allow visible light to pass through. In principle, it is also possible to "stack" several electroluminescent light elements of this type on each other, as appropriate with opposite orientations to each other, possibly using only a single common intermediate electrode.

It has also been possible to obtain another particular light effect, by enclosing, of course, the light element in a laminated window, but by not placing the opaque coating directly on the electrode layer, but from the other side of the external window on the outer surface thereof (and thereby providing it, for example by baking, with sufficient mechanical strength). A certain proportion of nonoriented light could still exit, by lateral dispersion, possibly through surface portions of this opaque coating which allow light to pass through.

Other details and advantages of the subject of the invention will become apparent from the drawing of an exemplary embodiment and by its detailed description which follows.

Figure 2:
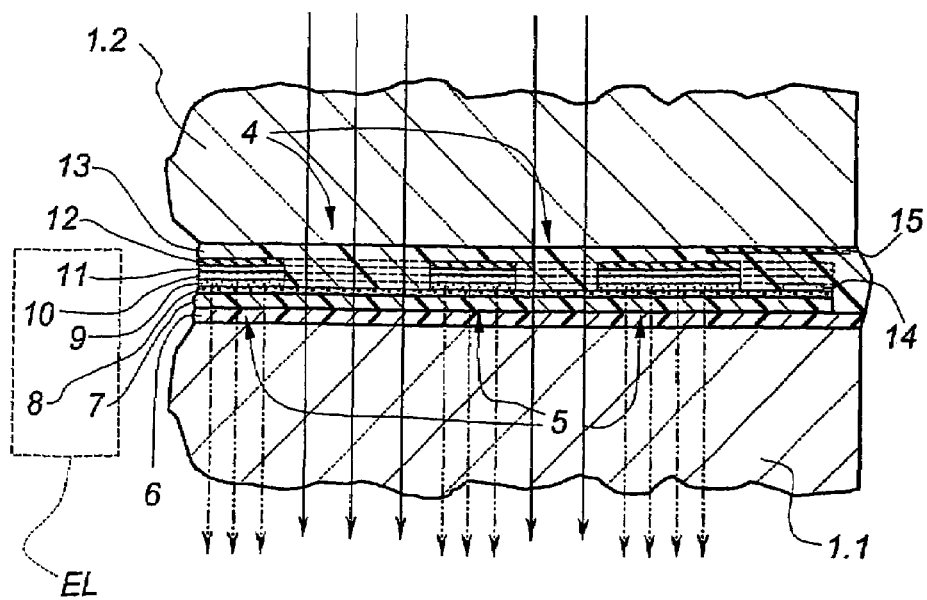

In the drawings having a simplified representation,

FIG. 1 is a view of a window with an opaque coating with a structure in the form of a pattern; and FIG. 2 shows, in a section through the window of FIG. 1 along the line II-II, the outline structure of the layers of this laminated window equipped with an electroluminescent light element according to the invention.

According to FIG. 1, a naturally transparent window 1 is provided with an opaque coating 2. In a surface region 3 (surrounded by a broken line for more clarity), the latter is perforated with surface portions 4 allowing light to pass through, therefore transparent, distributed uniformly over the surface, which alternate with opaque surface portions 5, while considering moreover that in this case the entire surface region 3 is covered with the design illustrated.

The regular pattern shown here and its size with respect to the surface area of the window is however only an exemplary embodiment or arrangement. By means of screen printing, it is possible to produce virtually any other desired combination, in particular for an irregular surface, of opaque and transparent surface portions. The opaque surface portions do not necessarily have to be contiguous, within the scope of the invention. We will return again to this aspect below.

At least some of the opaque surface portions 5 are now coupled to an electroluminescent light element, whose presence is indicated by two electrical connection wires L. Its structure will now be described in more detail with reference to FIG. 2.

In transverse section, the surface of a first transparent (glass) pane 1.1 (which is turned toward a space to be illuminated in the mounted position) is followed firstly by a polyvinyl butyral (PVB) adhesive layer 6, which is assembled to a PET film 7 (preferably in the form of a previously laminated film). The two films 6 and 7 are transparent.

The PET film 7 is preferably continuously coated (in a manner known per se) with a transparent conducting layer 8, for example made of indium tin oxide (ITO), which forms one of the electrodes for an electroluminescent light element EL. After the ITO layer 8, comes the electroluminescent layer 9 deposited according to the desired arrangement or design, over which an (electrically nonconducting) dielectric layer 10 is again deposited.

The latter is followed by a highly conducting electrode layer 11, for example made of metallic silver. A silver layer of this sort has the well-known effect of a thermal mirror, that is to say that it strongly reflects infrared. This thermal protection effect may be advantageously exploited specifically in the case of use as a sunroof in motor vehicles.

The electrode layer 11 is again covered with an opaque color layer 12, which prevents the light radiated by the electroluminescent light element exiting toward this face and also has the effect of attenuating the passage of heat and light toward the inside. It also has a decorative aspect. The color layer 12 may be removed, if the light has to be emitted from both faces of the window 1, or when, for example, the electrode layer 11 has to have a certain mirror effect. The opacity of the coating in the opaque surface portions is then provided only by the electroluminescent layer, with assistance from the dielectric layer and from the structured electrode layer, as appropriate.

The PET film 7, the transparent conducting layer 8, the electroluminescent layer 9, the dielectric layer 10 and the conducting electrode layer 11, whose numerical references are brought together in a frame finely outlined with broken lines for the purpose of clarity, form the minimum components of the electroluminescent light element EL, except for the electrical connection wires.

Its manufacture may be carried out as follows: firstly, the transparent conducting coating 8 is deposited (for example by spraying) on the PET substrate 7 (also directly on one surface of a rigid pane, as required). The desired arrangement or design of the electroluminescent layer 9 is then produced, preferably by overlaying as a thick layer, followed by the dielectric layer 10. Next, the counter electrode 11 is deposited on the dielectric layer. The latter would have to be taken close to the edge of the window 1, in at least one location, in order to be able to produce, in a relatively simple manner, the electrical connection.

To prevent short circuits, it is absolutely necessary that the dielectric layer 10 covers at least the same surface area as the counter electrode 11. Therefore, if the dielectric layer 10 itself does not fully cover the surface, but is structured according to a design as in the representation, the counter electrode 11 must also be structured in the same way, so that it cannot be short-circuited with the transparent electrode 8. On the other hand, if the layers 10 and 11 also extend over the transparent surface portions 4 of the surface region 3, unlike the drawing, then naturally, they must themselves be sufficiently transparent.

The surface portion of the electroluminescent layer 9 may however be smaller than the surface areas of the dielectric layer 10 and of the counter electrode 11. The opaque surface regions (of the electroluminescent layer 9) once again must not be crosslinked directly one with the other, but they may be configured, for example, likewise in the form of a dot pattern. If the dielectric is not transparent, the surface portions allowing light to pass through must then be recessed by printing, for example, the electroluminescent layer and the dielectric with the same surface structure, while the electrode is produced directly on the surface. Each point then forms a specific light capacitor of small spread, and it is then possible to radiate different light colors likewise with a choice of different materials (which however involves several screen printing operations). If it is necessary to prevent light exiting through the dielectric, another printing of an opaque mask corresponding to the design of the electroluminescent layer would then be necessary.

By referring to the design illustrated in FIG. 1, it would also be possible for example to imagine covering only the intersection regions of the pattern with the electroluminescent layer.

The composite is completed by another layer, another PVB film 13 and a second (glass) pane 1.2, respectively, assembled thereto. It is recognized that the PVB layer 13 is connected to the layer 6 of the same material by melting the edge of the window 1. Thus, the inner region of the composite is sealed virtually hermetically against moisture and dirt. The two PVB layers 6 and 13 must be considered as together forming the intermediate layer for bonding the laminated window.

Furthermore, all the intermediate spaces in the structure of the electroluminescent layer are filled with PVB. Broken lines between the various portions of cut layers indicate the continuous extensions of the respective layers behind the plane of the section.

The proportions of size and thickness are in this case strongly distorted, since in reality the layers 8 to 12 are much thinner than the PVB layers 6 and 13. Similarly, the PET film 7 is in reality markedly thinner than a PVB film, yet much thicker than the layers 8 to 12.

An electrical connection conducting pathway 14, which is deposited in a known manner (in the form of a thin strip of metal or as a printed conducting pathway) on the layer 8, and which may be connected to the outside (by means of conductors L illustrated in FIG. 1), so as to power the electroluminescent light element, has been indicated close to the edge of the window 1 on the transparent electrode layer 8. In another variant, it is also possible to deposit an opaque coating in the form of a frame 15 on the inner face of the pane 1.2 in order to mask the edge regions of the pane at the periphery.

Finally, arrows denote the passages of light (transparent surface portions 4) or the light rays to be emitted by the electroluminescent light element (opaque surface portions 5). It is recognized that both the latter pass through the transparent electrode 8 together with the films 6 and 7 and the pane 1.1 and exit through the face of the latter.

The two electrodes 8 and 11, which are in all cases reliably electrically insulated from each other by the dielectric layer 10, may, in a suitable manner known per se, each be separately electrically connected to the output wires L and be taken to the outside. The corresponding technologies have already been described many times and do not have to be stated in detail here.

In a variant of the electroluminescent light element EL known in principle from EP-A1-0 267 331, it would also be possible to conceive dividing the ITO layer 8 deposited on the PET film 7 into one or more regions and to connect each of the surface regions thus formed in pairs to different poles of the supply voltage. The electrode layer, that is to say the counter electrode 11, would then act in a known manner as a bridging electrode in each case between two light elements mounted electrically in series. Its surface resistance would then be as low as possible. A silver layer would be suitable for this purpose. This configuration has the advantage that all the external electrical connections only have to be in a single plane.

The invention claimed is:

1. A window for an enclosed region, comprising:
   a transparent panel covering a part of the enclosed region and having one side facing an interior of the enclosed region and another side facing an exterior of the enclosed region;
   at least one flat electroluminescent light element with plural layers and including a transparent electrode provided at said transparent panel at a side of the electroluminescent light element facing the interior of the enclosed region and another electrode provided at said transparent pane at a side of the electroluminescent light element facing the exterior of the enclosed region;
   an opaque element provided at said transparent panel to be separate from, exterior to, and in addition to, said another electrode such that said panel has both an opaque surface portion and a surface portion allowing light to pass therethrough;
   wherein said at least one flat electroluminescent light element is positioned relative to said opaque surface portion such that the passage of light from said at least one flat electroluminescent light element to the exterior of the enclosed region is substantially obstructed by said opaque surface portion, and the passage of light from said at least one flat electroluminescent light element to the interior of the enclosed region is substantially unobstructed by said opaque surface portion; and
   an electrical supply voltage connectable to the transparent electrode.

2. The window as claimed in claim 1, wherein said transparent panel comprises at least two rigid panes and an intermediate layer assembling the rigid panes to each other, in which the opaque element and the light element are embedded in the intermediate layer or are arranged on one face of one of the rigid panes located inside the window.

3. The window as claimed in claim 1, wherein the surface portion allowing light to pass comprises plural surface portions regularly distributed between plural opaque surface portions.

4. The window as claimed in claim 1, wherein the light element is arranged on a support film.

5. The window as claimed in claim 1, wherein the opaque surface portion comprises an opaque coating masking the light element on one face.

6. The window as claimed in claim 1, wherein the electroluminescent layer of the electroluminescent light element is divided discontinuously into plural surface portions arranged according to a design, or in a desired arrangement, with at least one electrode used in common for plural of these surface portions.

7. The window as claimed in claim 6, wherein the electroluminescent layer is arranged in a dot pattern.

8. The window as claimed in claim 1, wherein plural electroluminescent light elements are provided side by side to be triggered independently of each other, and that have a common electrode.

9. The window as claimed in claim 1, wherein at least two electroluminescent light elements are provided one above another to be triggered independently of each other and that have a common central electrode.

10. The window as claimed in claim 1, wherein the opaque element comprises an opaque layer, and wherein an electrode of the light element is provided directly at a side of the opaque layer facing an interior of the enclosed region.

* * * * *